United States Patent [19]

Vogelsanger

[11] 4,358,911
[45] Nov. 16, 1982

[54] MACHINE FOR RELIEF GRINDING TAP THREADS

[75] Inventor: Emil Vogelsanger, Lohningen, Switzerland

[73] Assignee: Reishauer AG, Zurich, Switzerland

[21] Appl. No.: 217,300

[22] Filed: Dec. 17, 1980

[30] Foreign Application Priority Data

Dec. 28, 1979 [DE] Fed. Rep. of Germany ....... 2952610

[51] Int. Cl.³ ............................................. B24B 17/02
[52] U.S. Cl. ............................... 51/94 CS; 51/95 TG; 51/101 R; 51/288; 409/75; 409/76; 10/89 R; 10/105
[58] Field of Search ............. 51/34 C, 35, 48 R, 50 R, 51/50 PC, 93, 94 CS, 95 R, 95 LH, 95 WH, 95 TG, 97 NC, 100 R, 101 R, 105 EC, 105 LG; 409/75, 76, 95, 104, 111, 112, 122, 123, 125, 126, 130; 10/89 R, 89 WH, 102, 105

[56] References Cited

U.S. PATENT DOCUMENTS

| 1,389,835 | 9/1921 | Lecombe | 409/112 X |
| 2,053,866 | 9/1936 | Flygare | 51/101 R |
| 3,023,546 | 3/1962 | Beck | 51/288 X |
| 3,080,684 | 3/1963 | Stade et al. | 51/95 R X |
| 3,267,616 | 8/1966 | Stade et al. | 51/95 R |
| 3,905,156 | 9/1975 | Vogelsanger | 51/95 TG X |
| 3,943,664 | 3/1976 | Broide et al. | 51/101 R X |
| 3,994,099 | 11/1976 | Palmer | 51/94 CS |

Primary Examiner—Stephen G. Kunin
Assistant Examiner—Robert P. Olszewski
Attorney, Agent, or Firm—Sughrue, Mion, Zinn, Macpeak and Seas

[57] ABSTRACT

A relief thread grinding machine for making screw taps wherein a workpiece 10 is clamped to a resiliently mounted body 5 of a longitudinally adjustable sled 1. The body carries a follower wheel 17 which bears on a cam roller 15 rotatably mounted on the sled. The surface of the cam roller is eccentrically lobed so that when it is axially moved varying oscillation strokes of the body 5 are produced. The cam roller can be axially adjusted as needed during the grinding process so that the amount of relief grind can be changed. In this manner it is possible to provide the conical thread on the lead end of a tap with a different relief grind than the generally cylindrical and posteriorly weak conical thread on the guide end of the tap.

15 Claims, 10 Drawing Figures

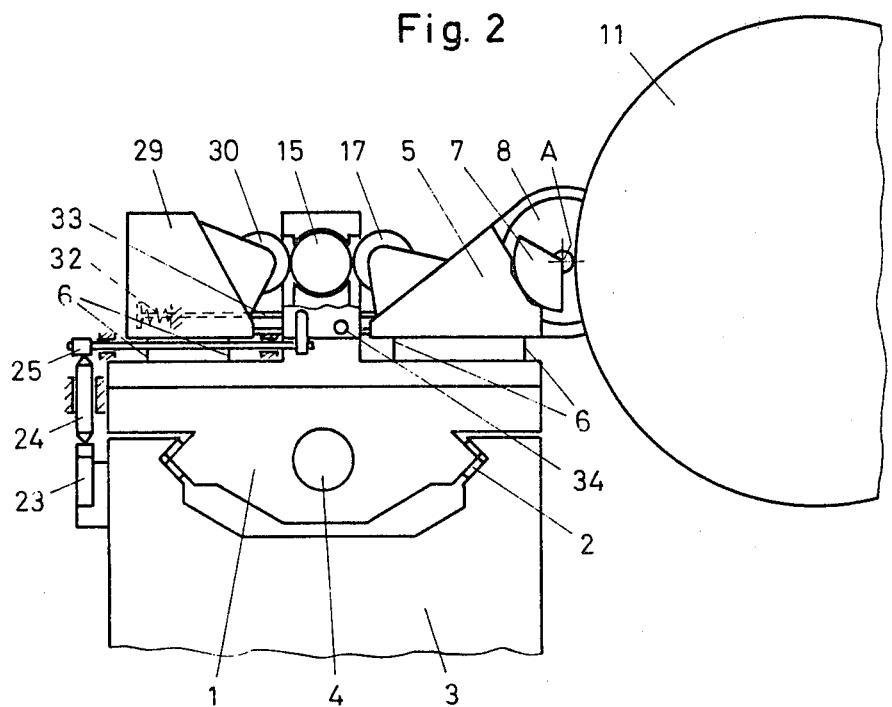
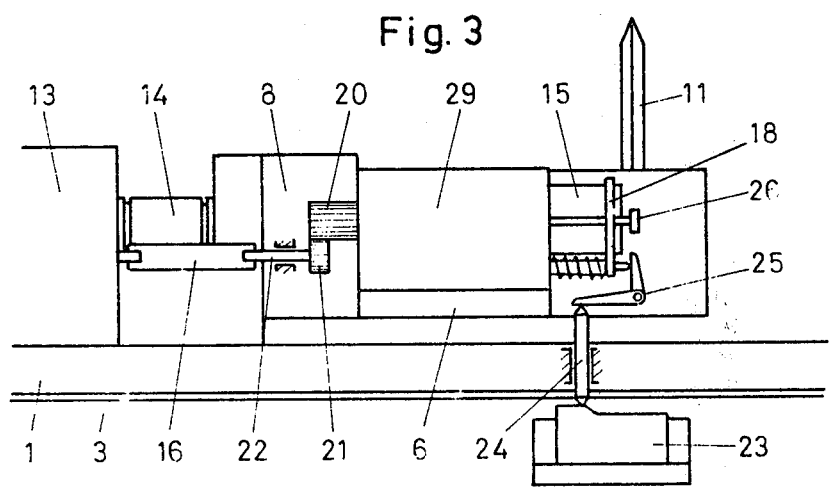

MACHINE FOR RELIEF GRINDING TAP THREADS

BACKGROUND OF THE INVENTION

This invention relates to a relief thread grinding machine for making screw taps or the like, wherein a workpiece is clamped to a relief grinding body of a longitudinally movable sled and a stroke producing device arranged on the sled provides the grinding body with an oscillating transverse movement while the workpiece rotates and is axially advanced by the sled past a laterally movable grinding disc.

A thread grinding machine for relief grinding the threads of taps and internal thread forming devices is disclosed in German Pat. No. 2,442,384. The tap stock is rotatable parallel to the workpiece spindle and is clamped to an upper part of a workpiece sled. This upper part is elastically connected with the lower part of the sled by leaf springs. A pivot lever attached in a lower part is actively connected with the upper part. The lever engages a rotating cam through a follower roller, and the lobe of the cam imparts an oscillating or swinging motion to the lever. The lever in turn induces oscillating movements of the upper part of the sled relative to the under part thereof as is necessary for relief grinding, whereby the swinging movements occur transverse to the workpiece axis.

The cam is exchangeably mounted to enable myriad forms of relief grinding. Adjustment of the relief grinding stroke is accomplished by means of an adjustable template in the lever which engages a guide roller mounted in the upper part.

SUMMARY OF THE INVENTION

The object of the present invention is to improve and simplify this known type of machine. Certain thread taps (female thread taps) and particularly thread forming devices are characterized by the varying sizes of the relief grinding. For this reason the conical portions of the workpieces must be prepared with more relief grind than the subsequent cylindrical guide portions. It should be possible with the relief grinding device to continually adjust the amount of relief grind during the grinding process.

This object is solved according to the invention by a relief grinding body provided with a rotary follower which bears on a cam roller mounted in the sled. The cam roller axis is parallel to the sliding movement of the workpiece sled and its surface is formed to enable various differing profile depths not exhibited by the normal cuts for the shaft axis. The cam roller is axially adjustable and secureable allowing the adjustment of the oscillation stroke of the relief grinding body.

The follower transfers the strokes of the cam roller directly to the relief grinding body, avoiding mistakes which can occur with more complicated transfer systems.

Advantageously the adjustment of the stroke is implemented by exchangeable templates. A follower rod and a lever assembly transfer the template stroke into an axial movement to adjust the cam roller.

In a preferred embodiment of the invention a compensation block is spring-connected with the workpiece sled and arranged opposite the grinding body. The compensation block has an additional rotary follower that also engages the cam roller whereby the latter is symmetrically constructed relative to its rotation axis in order to produce uniform oscillations of the compensation block and the grinding body in each normal section or angle cut. The follower(s) can be a rotary disc or a ball.

BRIEF DESCRIPTION OF THE DRAWINGS

FIG. 2 shows a schematic view in the direction of arrow II in FIG. 1, FIG. 3 shows a schematic view in the direction of arrow III in FIG. 1.

DETAILED DESCRIPTION OF THE PREFERRED EMBODIMENTS

Figure 1:
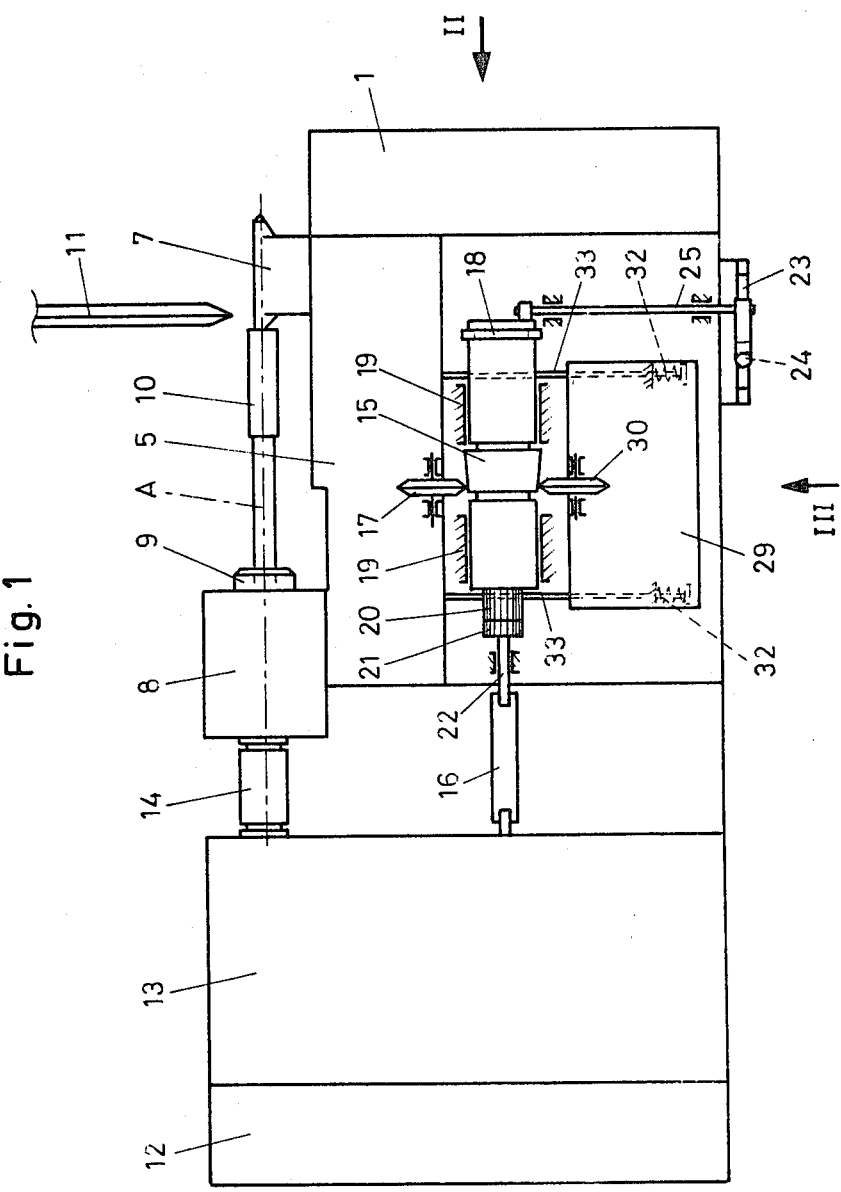
FIG. 1 shows a schematic top view of a thread grinding machine according to the invention.

Mention was made at the beginning of German Pat. No. 2,442,384 which discloses a thread grinding machine of the same general type. To avoid unnecessary repetition only cursory reference is made to the known features without thoroughly explaining them.

The workpiece sled 1 of the thread grinding machine is longitudinally adjustable on guides 2 of the stand 3 and can be moved back and forth in a known manner by the control spindle 4. The stand 3 is securely connected to the overall machine stand or base.

A relief grinding body 5 is located on the top of the sled 1. It is connected with the sled by leaf springs 6 so that a type of particulated rectangle is formed by means of which the body 5 can be oscillated transverse to the workpiece axis by means to be described later. The leaf springs 6 serve as a wear resistant guide for the body 5. The following parts are mounted on the relief grinding body: a foot stock 7 which is adjustably mounted allowing it to adapt to the length of the workpiece; a workpiece spindle 8 with a movable counter tip relative to the foot stock 7; and a chuck 9 which transfers the rotation moment from the workpiece spindle to the workpiece. The workpiece itself, a thread tap or an interior thread forming device, is designated by reference numeral 10, and the single or multiple profile grinding disc which is transversely adjustable is labelled by reference numeral 11.

The thread grinding machine has a gear change box 12 which contains the change gears for the various groove numbers of the workpieces. A transmission gear box 13 is located next to the gear change box 12. The transfer of rotation from the non-oscillating gear box 13 to the workpiece spindle which oscillates together with the grinding body 5 is implemented by a universal coupling 14 which allows the transverse displacement (parallel shift) of the respective rotational axes to the extent of the grinding stroke.

The oscillating movement is produced by a replaceable cam roller 15 mounted on the sled 1 so as to be rotatable and longitudinally adjustable. It is rotated by a universal coupling 16 from the gear box 13. The necessary rpm ratio between the cam roller 15 and the workpiece 10 depends on the number of flutes or the number forming edges of the work piece to be ground, and the notch number on the cam roller. This ratio is accommodated in a known manner by conversion wheels housed in the gear change box 12.

The relief grinding movement is derived directly from the cam roller in order to have as stable a construction and function as possible. This is done while purposely avoiding complicated transfer systems. A follower wheel 17 mounted on the body 5 bears on the surface of the cam roller 15 and transfers the stroke movements of the roller directly to the body 5. Depending on the axial position of the cam roller the amount of relief grinding can be varied from zero to a predetermined maximum.

The cam roller must be adapted or configured to provide the precise relief grinding performance required in each case, as is particularly customary with interior thread forming devices, i.e. it must be easy to replace with other rollers. It is especially simple to change the cam roller 15 because all that is needed is for the lever 18 to be disengaged and the removing device 34 swung out so that the roller can be removed by hand from its mounting.

Figure 8:
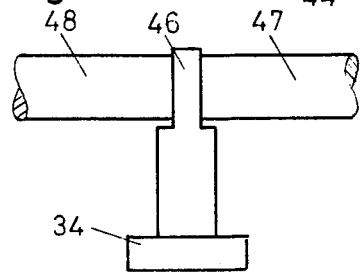
Figure 9:
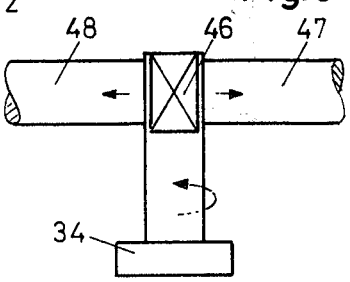

The flat end 46 of the removing device 34 lies between two rods 47, 48 which are connected with the body 5 and with the compensation block 29 (FIGS. 8 and 9). By turning the removing device 34 ninety degrees these parts 5, 29 are pressed away from the cam roller 15 so that the roller can be replaced.

The cam roller is rotated by a gear rim 20 attached to its one end and engaging a drive pinion 21 from gear box 13 by way of coupling 16 and an intermediate shaft 22.

Longitudinally or axially adjusting the cam roller 15 relative to the workpiece sled 1 during the grinding process is controlled by a template 23. The template is mounted on the stationary stand 3 of the machine, and can be removed and adjusted in the longitudinal and vertical directions. The template 23 serves as the "data carrier" for the magnitude of the relief grinding. A follower rod 24 transfers the template stroke to a lever assembly 25 which in turn converts the movement into an axial displacement to adjust the cam roller. The rod 24 engages a pivot arm 35 which is attached to an end of an axle 37 which is provided with a torsion spring 36. A pivot lever 38 is also mounted on the axle, and its end engages a bar 39 provided with a compression spring 40. The lever 18 attached to the latter extends into an annular groove 41 in the cam roller 15 in order to transport it. The rod 24 which is spring biased against the template 23 moves down as the sled is brought into position. The movement of the lever assembly 25 is transferred to the free end of the cam roller.

In place of the automatic stroke accommodation by means of template 23 it is also possible to accomplish the desired axial adjustment of the cam roller 15 by means of an adjustment screw 26. It is threaded into lever 18 and bears against the spindle housing. Depending on the length to which the screw is turned the entire template, only a part thereof, or none of the template can be used. The adjustment screw 26 thus functions as a stop in this sense.

The template 23 is attached to a support 44 by screws 42 and a vertical slot 43. This allows the vertical adjustment of the template. The support 44 is in turn mounted by screw 42' and a longitudinal slot 45 to the workpiece stand 3 to enable horizontal adjustment. These adjustments serve to exactly determine the point at which the cam roller is engaged by the follower wheel 17.

Figure 4:
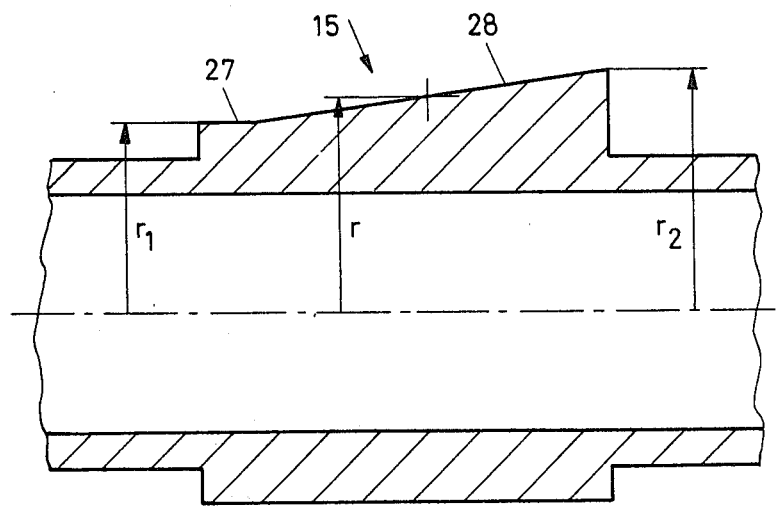
FIG. 4 shows a longitudinal section along the line IV—IV in FIG. 5 through a part of the cam roller.

The shape of the cam roller 15 is essential for determining the size of the stroke and the type of oscillating movement transferred to the grinding body 5. As can be seen in FIG. 4 the cam roller has, starting from a short cylindrical section 27 (for zero relief grinding movement), an axial protrusion 28 which "grows" out of the cylindrical section. The distance of this protrusion from the roller axis increases constantly beginning from a cylinder radius of $r_1$ to a maximum value of $r_2$ for the greatest stroke. The protrusion functions as a notch or cam lobe which is variable along its length.

As a result the cam roller has a different profile depth within its lobe in every section or cut normal to the roller axis. It thus provides a different relief grinding stroke in each section or cut. Since the cam roller can be axially adjusted during the grinding process it is thus possible to infinitely vary the stroke of the tool doing the grinding.

The compensation block 29 is provided in order to achieve as exact relief grinding movements as possible without unwanted extraneous oscillations. It is also supported on leaf springs 6 and is situated above the sled 1 opposite the grinding body 5. The mass of the compensation block approximately corresponds to that of the grinding body.

Figure 5:
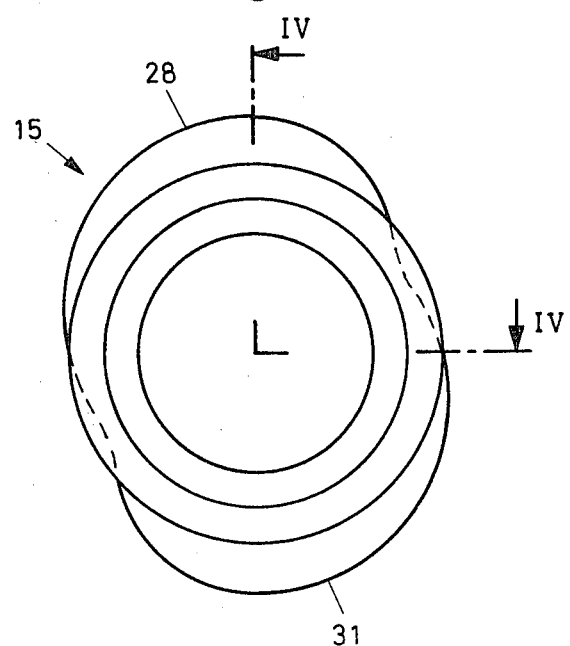
FIG. 5 shows a frontal view of a cam roller according to FIG. 4, FIG. 6 and FIG. 7 schematically show the template and the lever assembly in magnified scale, FIGS. 8 and 9 schematically show the removing mechanism for changing the cam roller.
Figure 6:
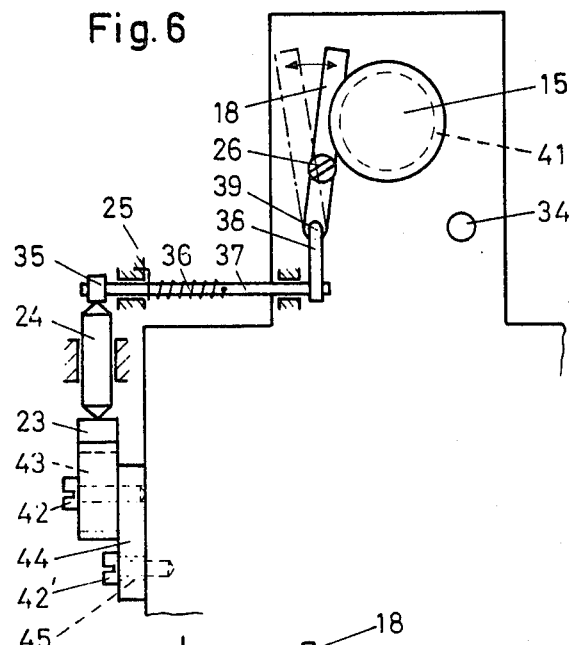
Figure 7:
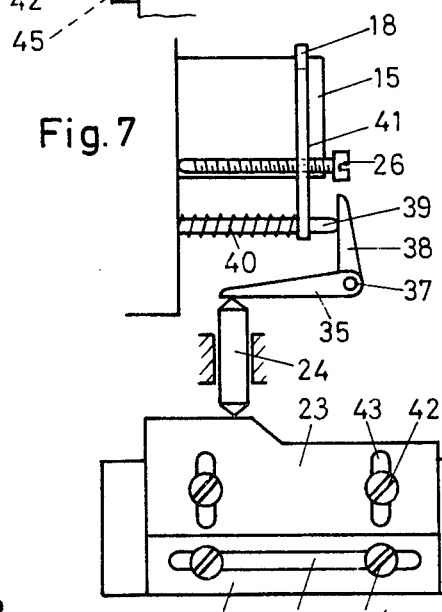

The compensation block 29 engages the cam roller 15 through a follower wheel 30 and simultaneously receives through the latter the same movements as the grinding body but in the opposite direction. This compensation block relieves the effects of the mass forces of the relief grinding movements as carried out by the body 5 on the workpiece sled 1, whereby damaging oscillations influencing the surface of the workpiece being ground can be avoided. The cam roller must be point symmetrically formed relative to its rotation axis for this purpose, i.e. it always has the same number of identical but opposite lobes, such as 28 and 31 in FIG. 5.

Since the characteristics of the leaf springs 6 in the working area are equal and the stroke movement of the body 5 and the compensation block 29 is relatively short, the springs serve primarily as low friction guides for the movements of the body and block. Auxiliary pressure springs 32 serve as supports for the purposely under designed leaf springs 6. These additional springs simultaneously urge the body 5 and the compensation block 29 against the cam roller 15 by way of a specially adapted mount. As a result they must be designed to maintain the contact of the body 5 and the compensation block 29 with the cam roller during the return stroke even at the greatest operating speeds. Tie bolts 33 serve to transfer the prestress forces of springs 32 between the grinding body and the compensation block.

Figure 10:
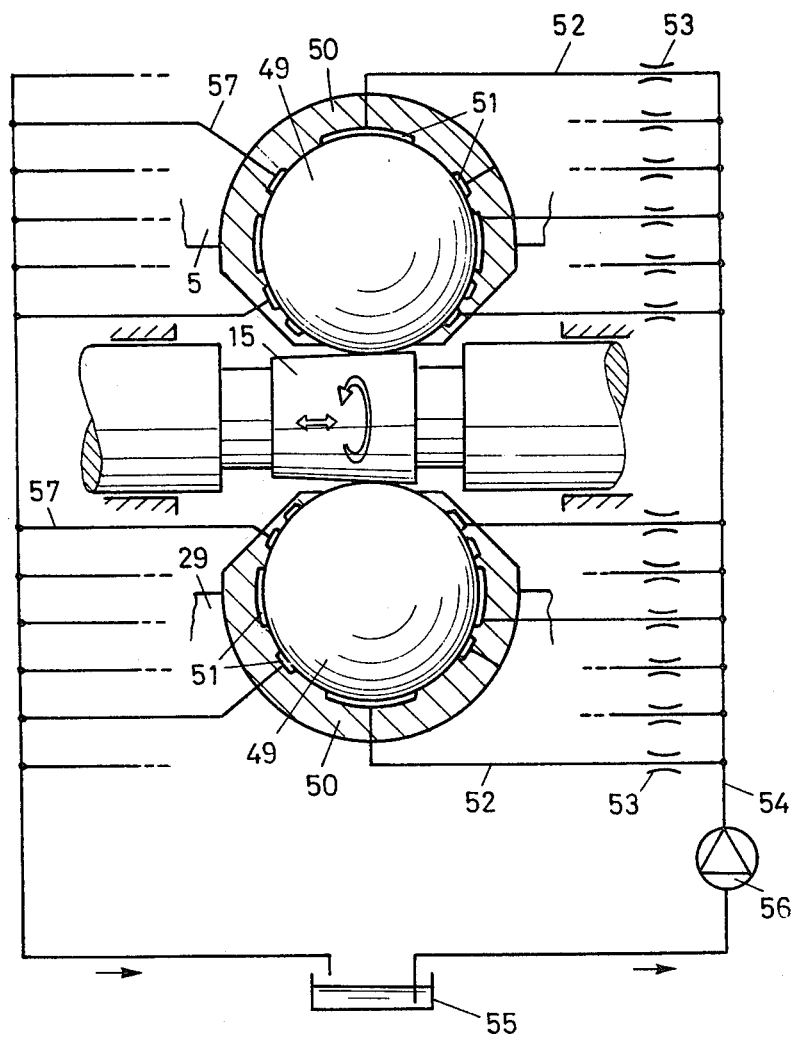
FIG. 10 shows a top schematic view of two alternative cam followers.

As can be seen from FIG. 10 the following cam roller 15 can be done by two balls 49 instead of the cambered wheels 17, 30. The balls 49 are carried in sockets 50 mounted on the grinding body 5 and the compensation block 29. The balls 49 are hydrostatically supported. To this end several grooves or pockets 51 are machined into the sockets 50 and are connected with hydraulic feed lines 52, one such line being provided for each pocket 51.

A throttle valve 53 is arranged in each of the feed lines 52 so that the hydraulic pressure in each pocket can be individually adjusted. The feed lines 52 are connected to a supply line 54 which is provided by means of pump 56 with pressurized hydraulic fluid supplied from a reservoir 55. Each pocket is additionally provided with a return line 57.

As a result of the hydrostatic mounting the friction is reduced to a minimum. The cam roller 15 can also be adjusted without problems if the machine is idle because the balls always roll freely on the surface of the cam roller independent of the movement of the latter—radially or axially.

In place of the hydrostatic mounting of the balls they could also be placed in bearing metal seats, at the expense of somewhat greater friction. Separate pumps can also be used in place of the throttle valves 53 for each feed line 52.

What is claimed is:

1. A relief grinding machine for cutting screw tap threads in a workpiece (10) mounted on a body (5) of a longitudinally movable sled, wherein means are provided on the sled for producing a stroking motion which transversely oscillates the body while the workpiece rotates and is moved by the sled past a transversely adjustable grinding disc (11), characterized by: the body (5) mounting a follower (17) which rides on the lobe curvatures of a cam roller (15) mounted on the sled (1), the roller axis being parallel to the direction of movement of the sled, the roller having a surface configured so that different cuts normal to the workpiece axis have varying profile depths, and the cam roller being axially adjustable and secureable to adjust the oscillating stroke of the body (5).

2. A grinding machine according to claim 1, wherein the cam roller has at least one axially extending lobe whose radial distance from the roller axis increases continually from an initial value to a maximum value in an axial direction.

3. A grinding machine according to claim 1, further comprising an axial adjustment screw (26) cooperable with an end of the cam roller (15).

4. A grinding machine according to claim 1, further comprising means for axially adjusting the cam roller (15) including a template (23) mounted on a machine stand (3) and a follower rod (24) for transferring the template stroke via a lever assembly (25) to the cam roller (15).

5. A grinding machine according to claim 4, wherein the template (23) is attached to the machine stand so as to be exchangeable and adjustable both vertically and horizontally.

6. A grinding machine according to claim 1, wherein a compensation block (29) is spring-connected to the sled opposite the body (5), the compensation block having an additional follower (30) which rides on the cam roller, and the latter is symmetrically formed about its rotation axis to produce corresponding but opposite oscillations of the compensation block and the body.

7. A grinding machine according to claim 6, wherein the body and the compensation block are connected with the sled by leaf springs (6) which simultaneously serve as guides.

8. A grinding machine according to claim 7, wherein additional springs (32) are arranged in the compensation block to support the leaf springs (6) in order to press the block against the cam roller, and a tie bolt (33) which transfers the forces of the additional springs (32) is arranged between the body and the compensation block.

9. A grinding machine according to claim 1, wherein the cam roller (15) is replaceably mounted on the sled and can be removed from its mounts (19) by disengaging a retention lever (18) and lifting off the followers (17, 30) from the cam roller with a removing device (34).

10. A grinding machine according to claim 1, wherein the cam roller (15) has a cylindrical section (27) on at least one end.

11. A grinding machine according to claims 1 or 6, wherein the followers are rotatable wheels.

12. A grinding machine according to claims 1 or 6, wherein the followers are balls (49).

13. A grinding machine accoding to claim 12, wherein the balls are hydrostatically mounted in sockets (50).

14. A grinding machine according to claim 13, wherein grooves (51) are formed in the sockets an a supply line (52) for a hydraulic fluid is coupled to each groove.

15. A grinding machine according to claim 14, wherein a throttle valve (53) is provided in each supply line.

* * * * *